June 24, 1969  R. W. PEPIN  3,452,329
SUPERVISORY CONTROL SYSTEM
Filed Nov. 16, 1964  Sheet 1 of 13

INVENTOR
RONALD W. PEPIN
ATTY.

United States Patent Office 3,452,329
Patented June 24, 1969

3,452,329
SUPERVISORY CONTROL SYSTEM
Ronald W. Pepin, Naperville, Ill., assignor, by mesne assignments, to Leeds & Northrup Company, Philadelphia, Pa., a corporation of Pennsylvania
Filed Nov. 16, 1964, Ser. No. 411,348
Int. Cl. H04q 3/58
U.S. Cl. 340—163         14 Claims

ABSTRACT OF THE DISCLOSURE

A supervisory and control system having a master station and a single remote station. Changes in remote control devices at the remote station cause transmission of a message indicating the current status of all remote control devices, to the master station. Control of devices at the remote station is effected from the master station, by first selecting and checking an operating path to the device and then operating it.

---

This invention relates to a control system for use in fields such as electric power control, gas or petroleum pipeline control and similar environments. More particularly, it pertains to a system providing means for selecting and operating control equipment at a distant point and reporting back to the initiating point an indication of the status of such control equipment.

In the present system devices having two states (such as on-off) or three states (such as open-intransit-close) may be supervised or controlled. The instant system is basically a quiescent system, that is, it remains at rest until a change takes place in the supervised equipment. At that time, the signals are telemetered to the master station where audible and visual alarms notify the operator of the location and nature of the change. By operating controls at the master station, the operator can take the appropriate action required.

Accordingly, it is the object of this invention to provide a system for controlling equipment at a remote station from a master station in electric power distribution, pipeline or similar systems.

A first feature of the instant system is the inclusion of reed relay circuitry to provide both high speed and reliable operation in a control system.

A second feature is the inclusion of checking means for checking transmissions between remote and master stations.

Another feature of the instant system is the utilization of select a path, before-operate circuitry to minimize errors in addressing proper equipment at a remote station.

And another feature of the system is the adaptation of similar circuitry for use at both master and remote stations. A final feature is the inclusion of circuitry that may be readily expanded to provide for enlargement of the system based on the addition of additional control points at the remote station.

Figure 1:
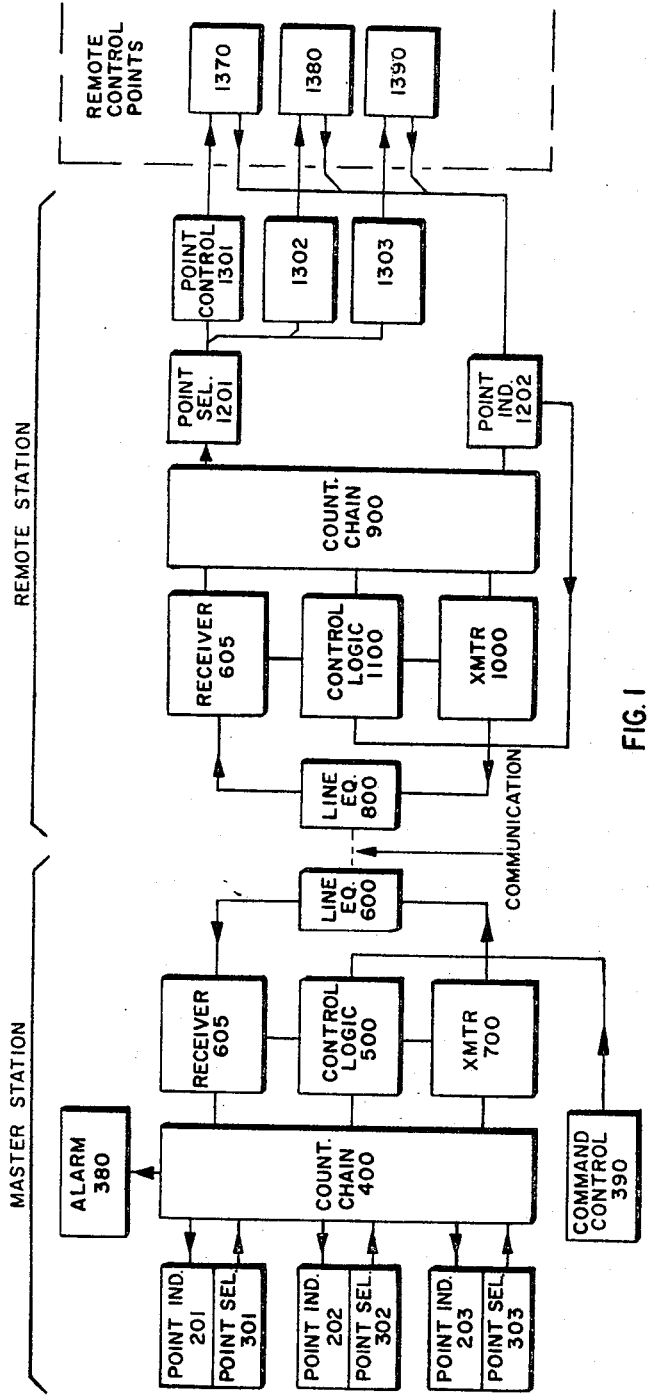
Figure 14:
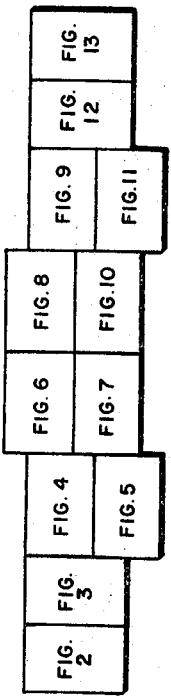
Figure 2:
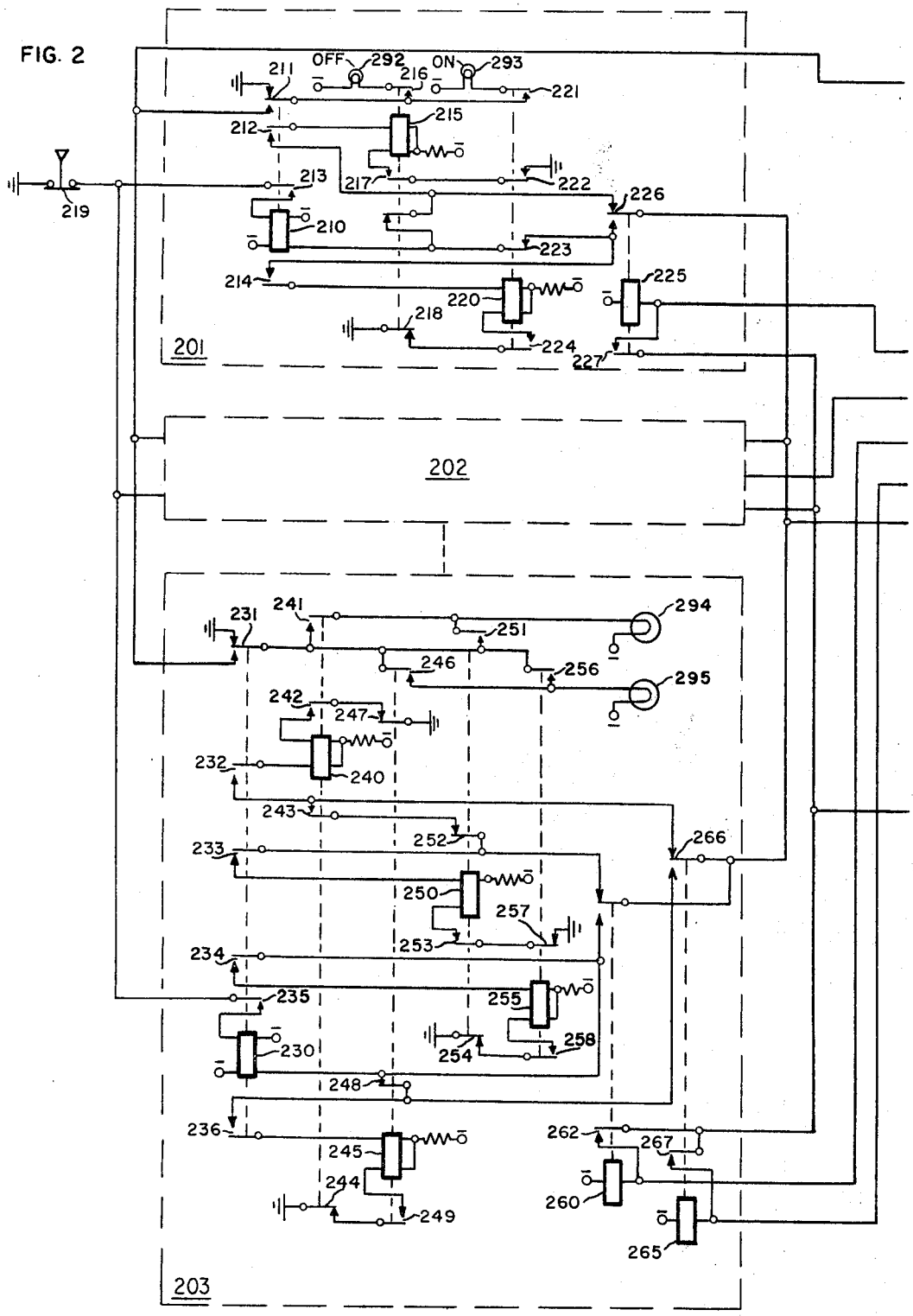
Figure 3:
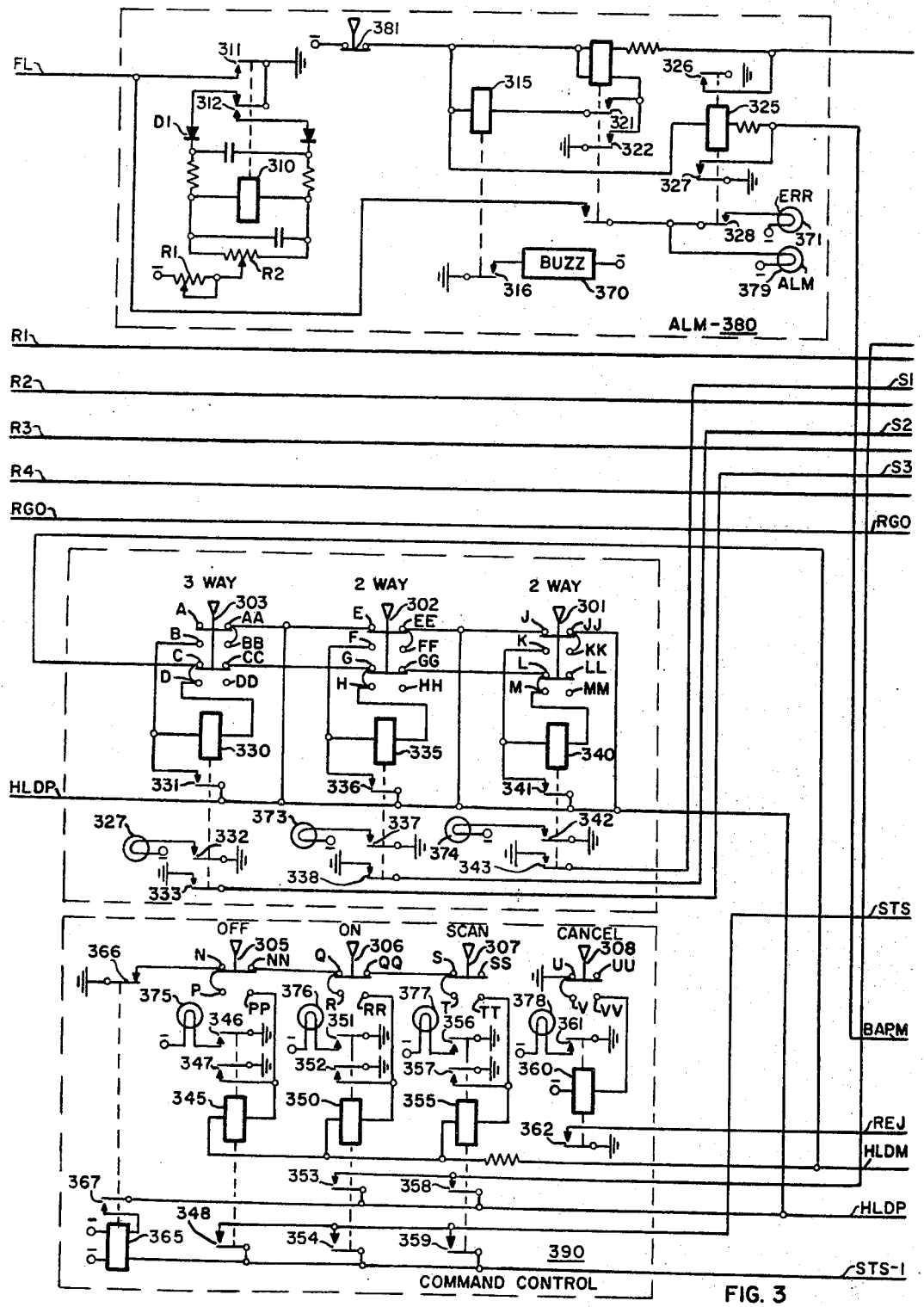
Figure 4:
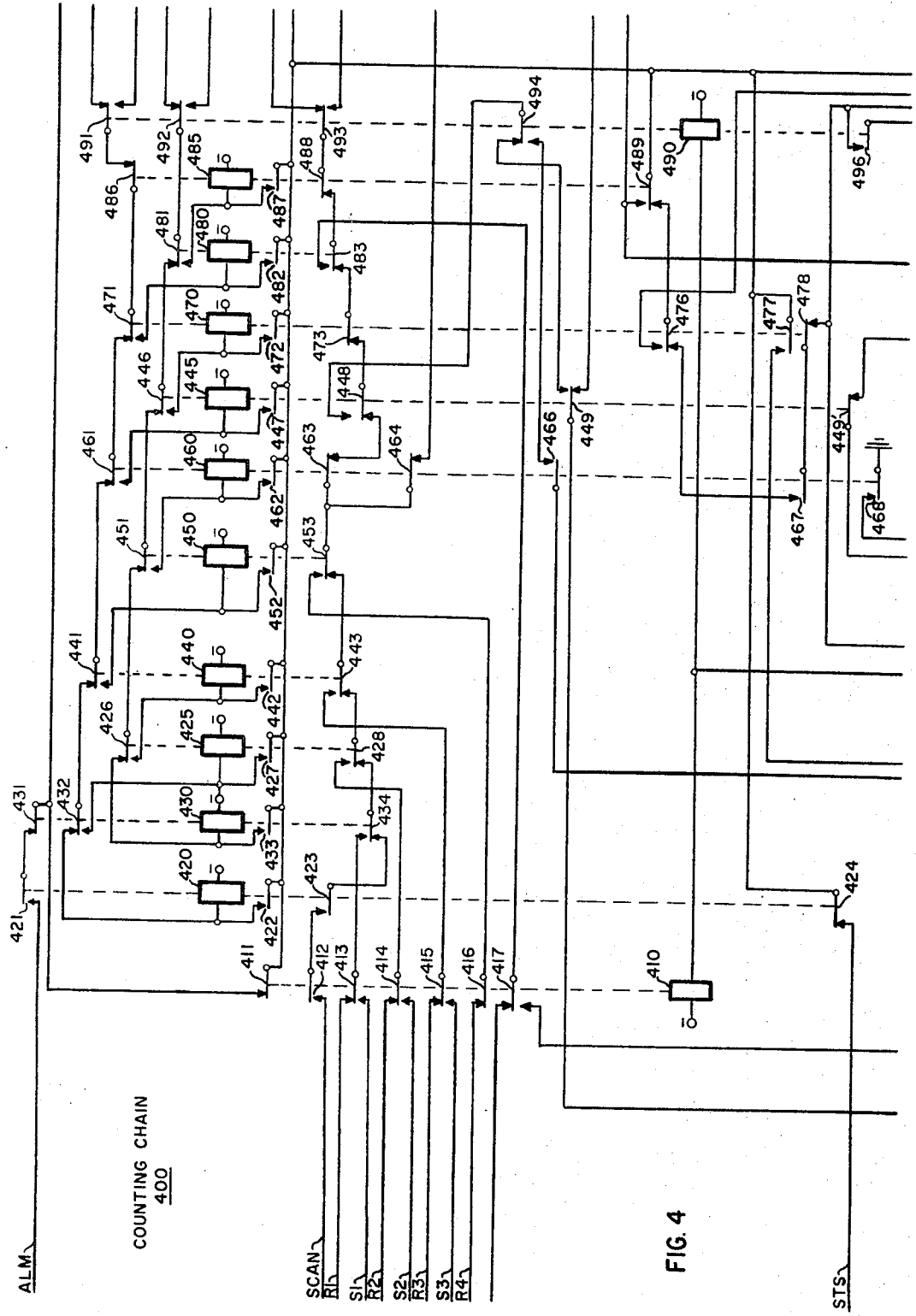
Figure 5:
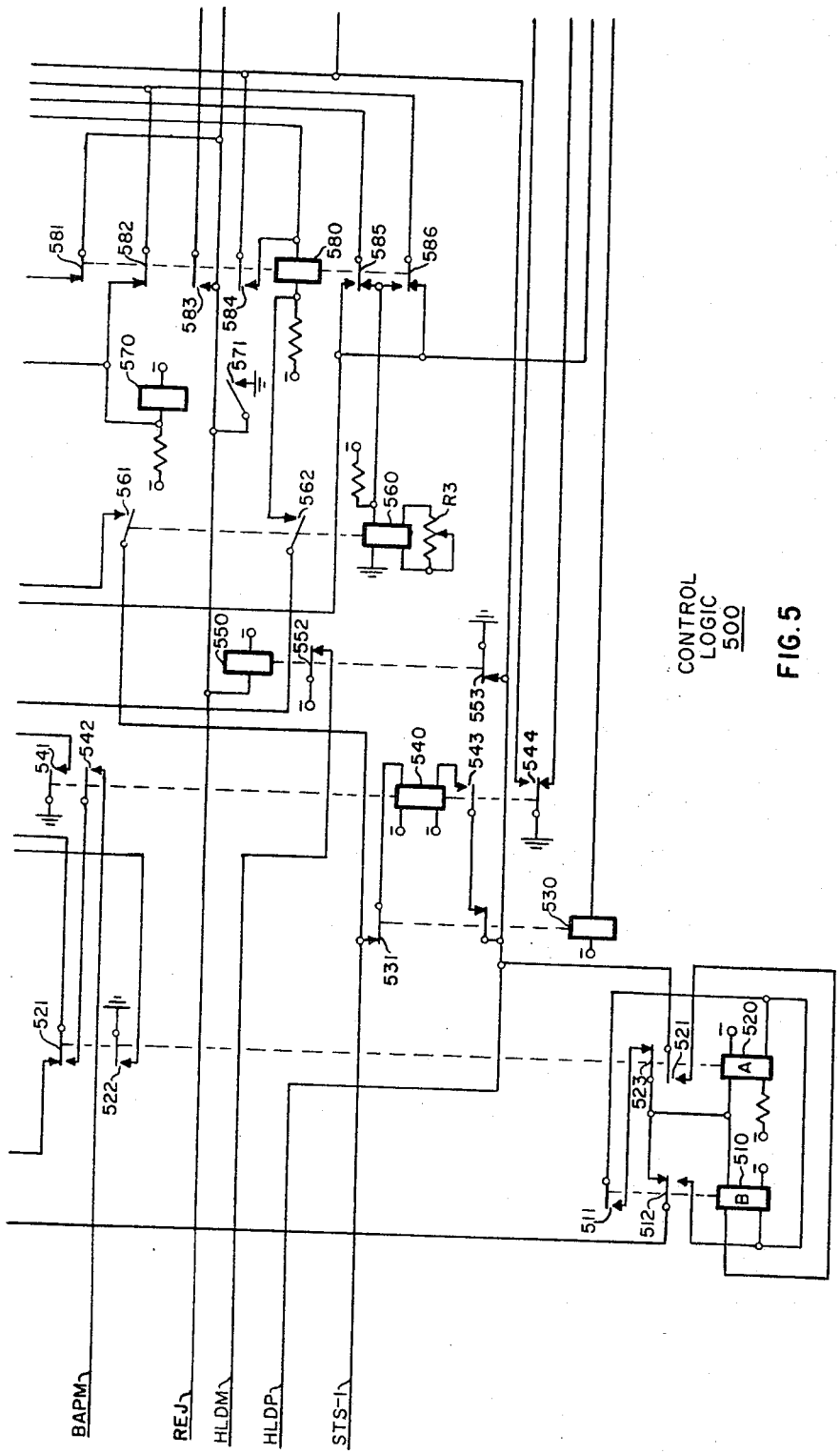
Figure 6:
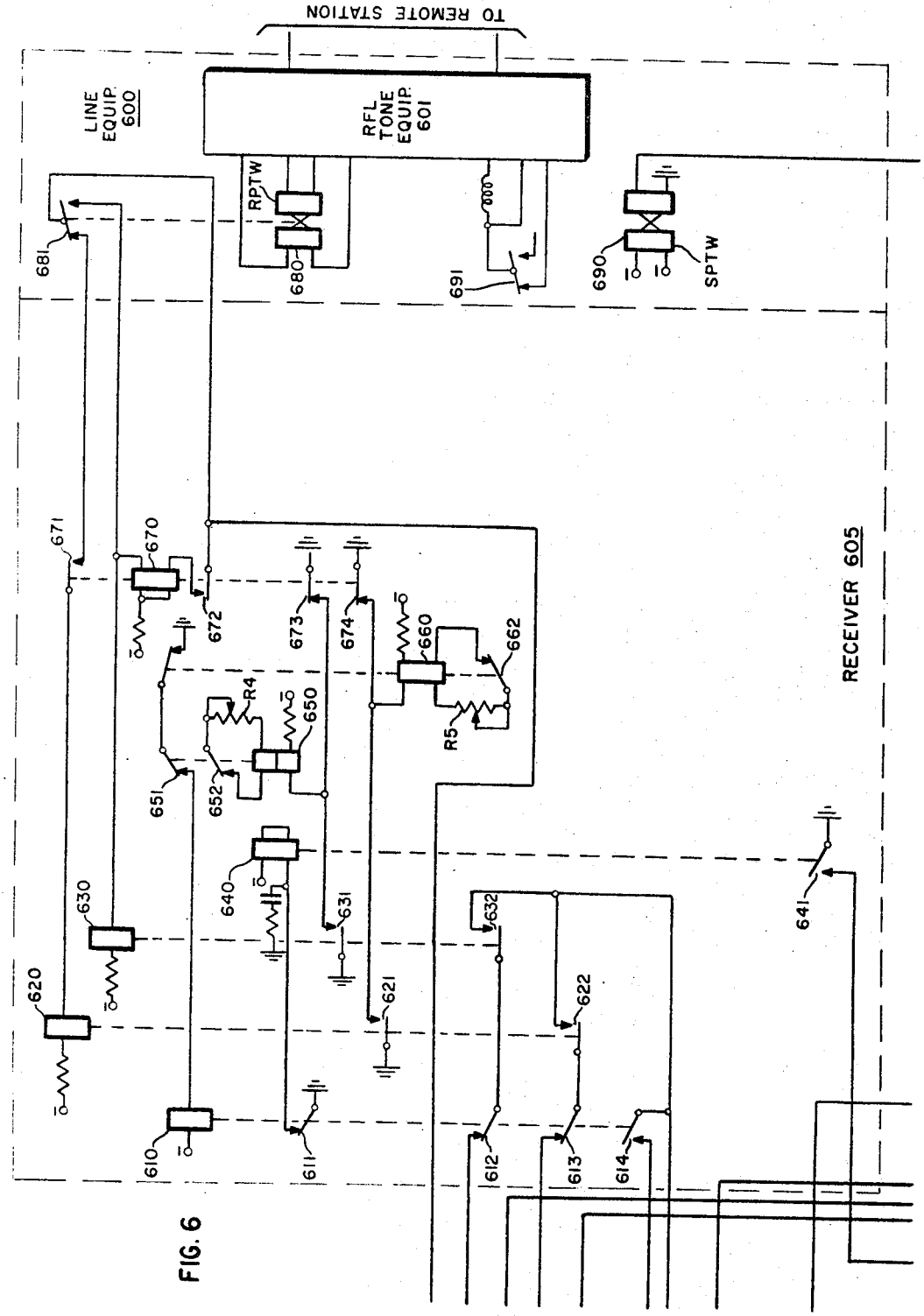
Figure 7:
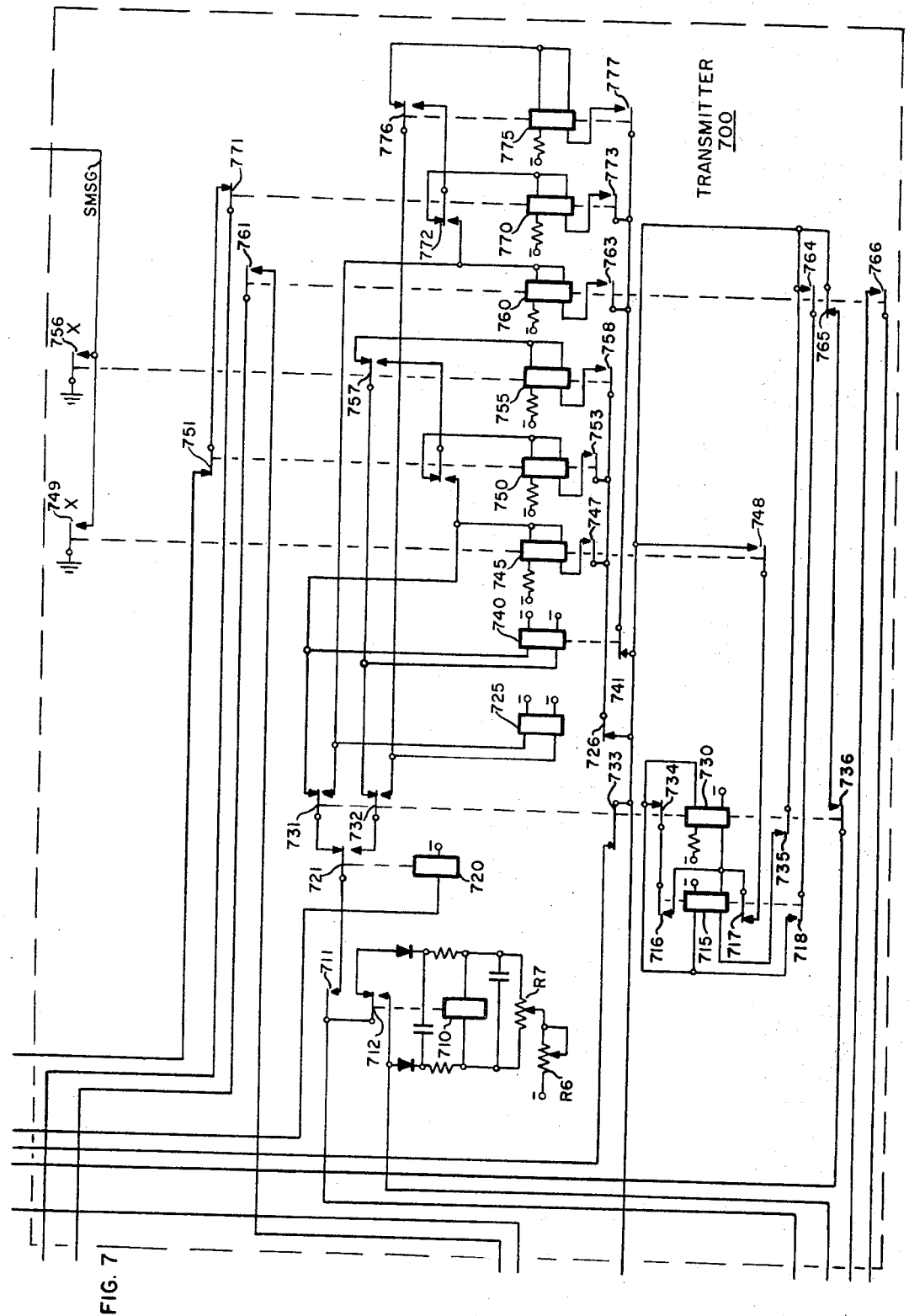
Figure 8:
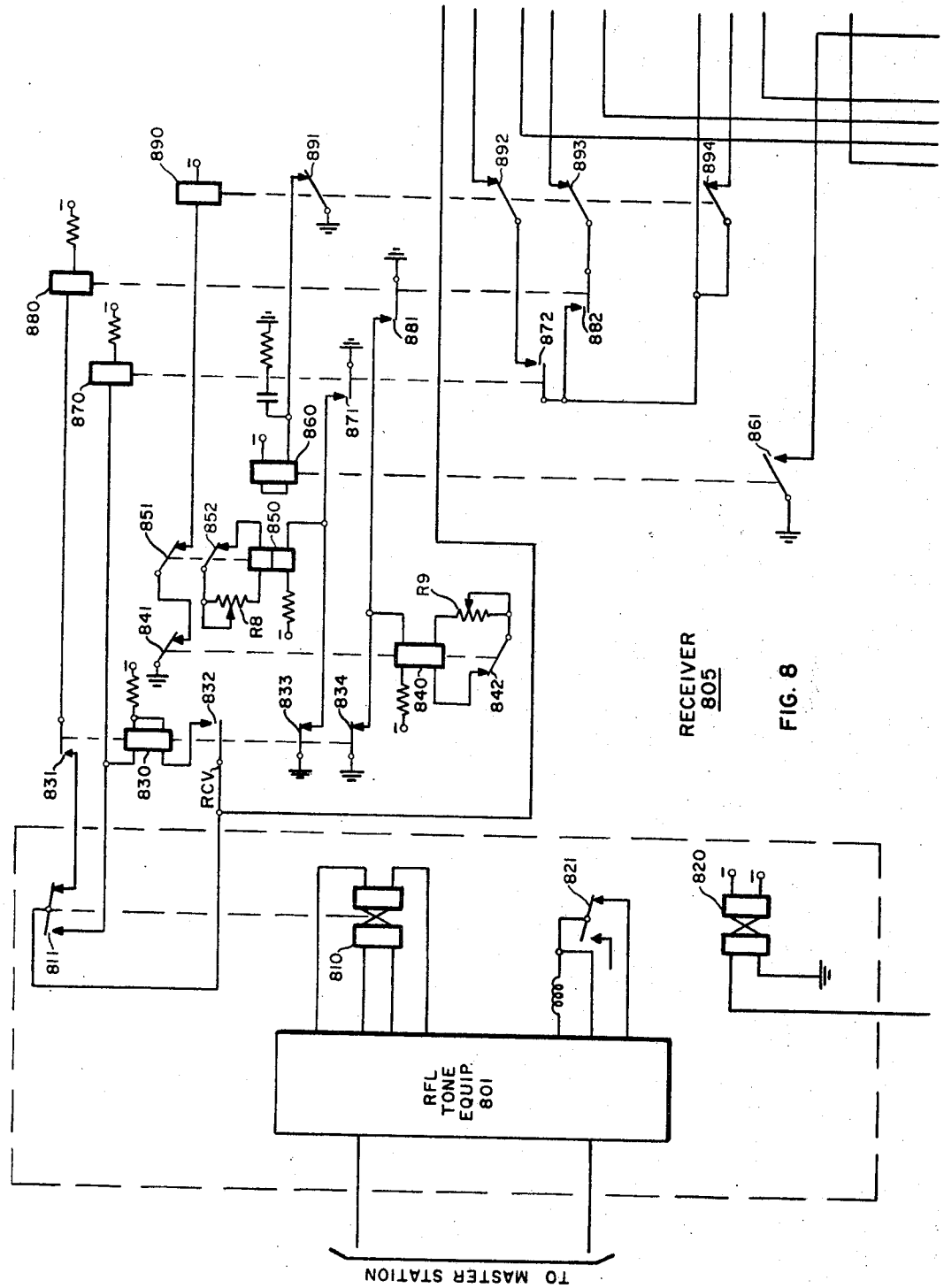
Figure 9:
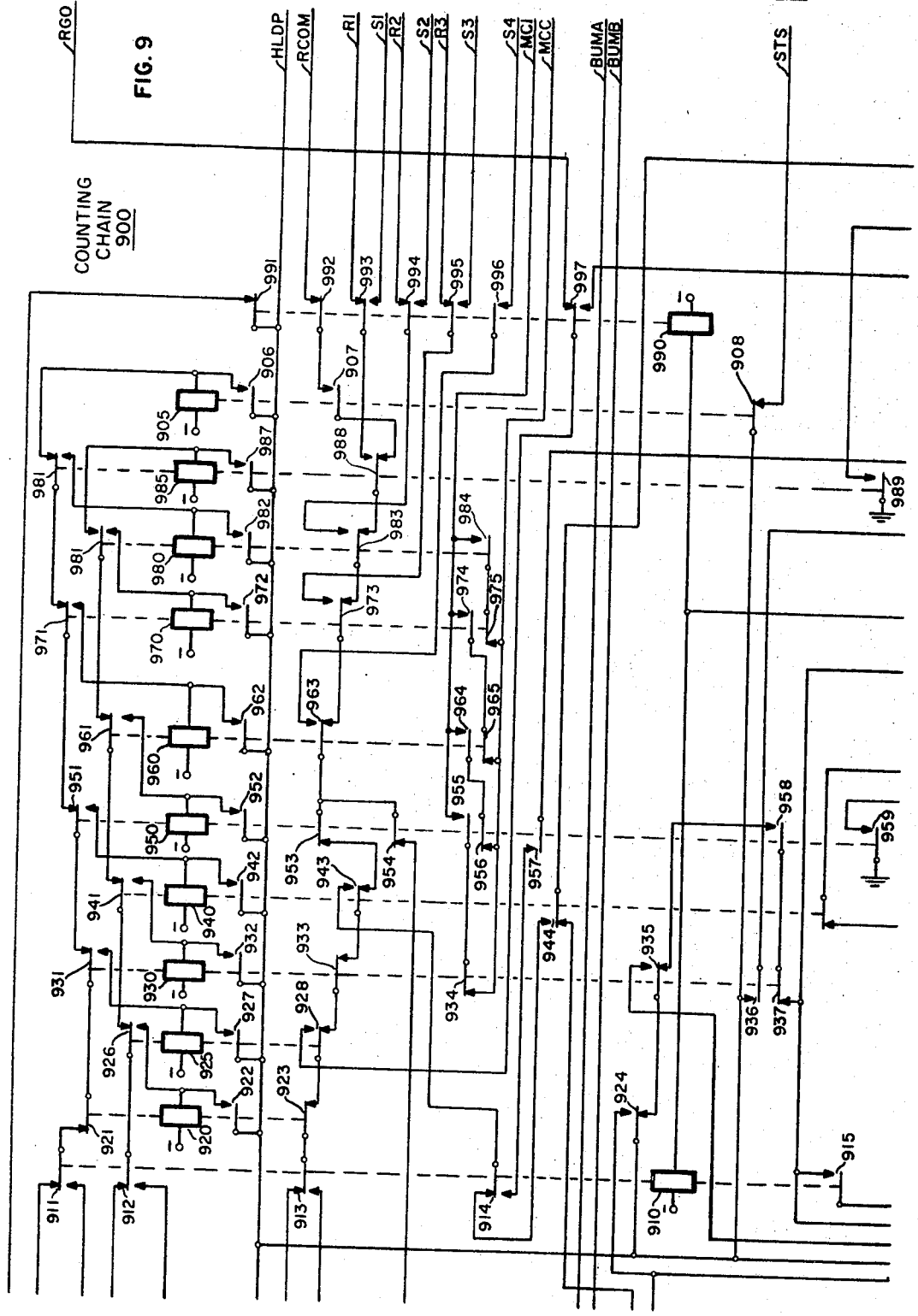
Figure 10:
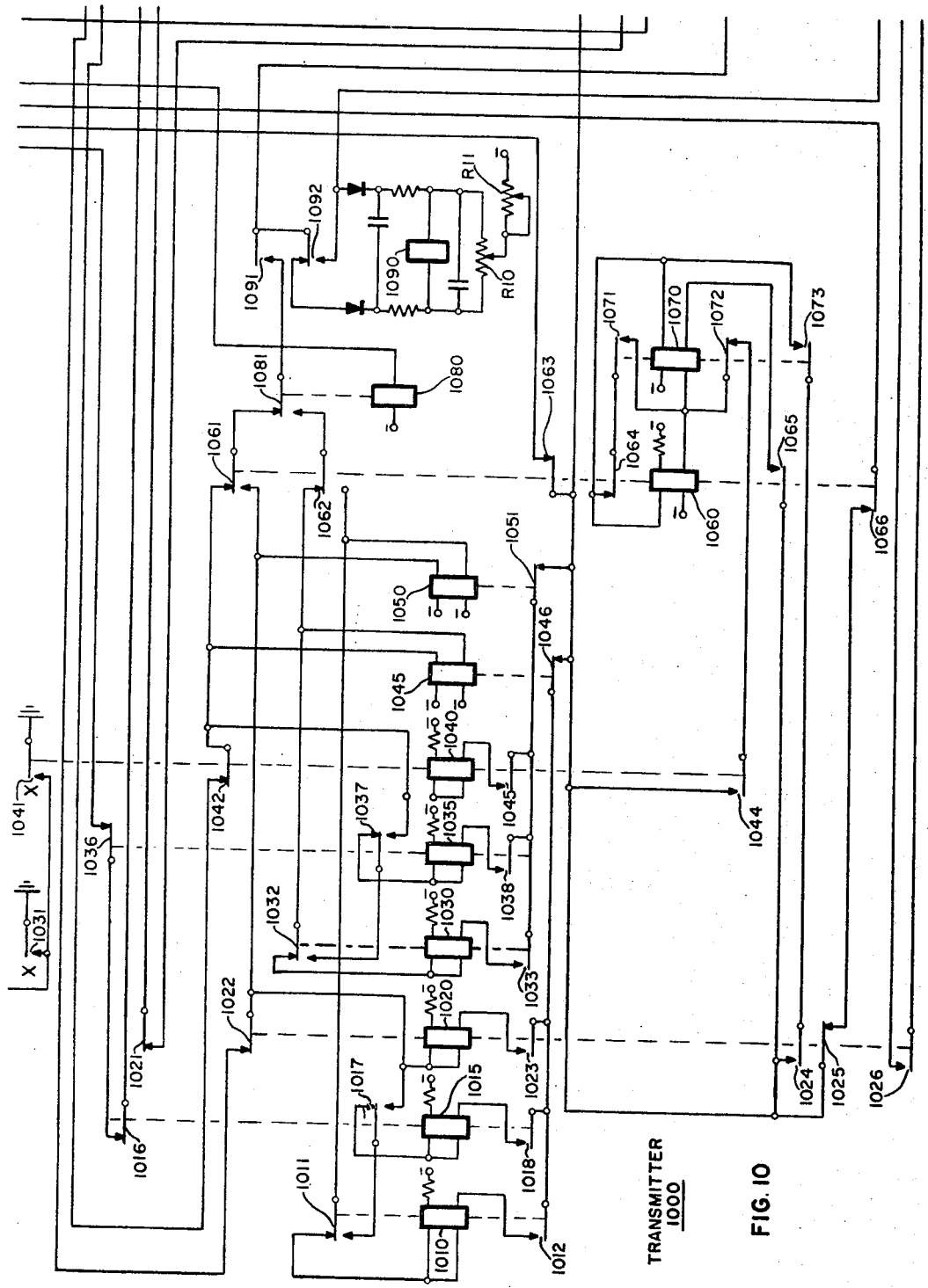
Figure 11:
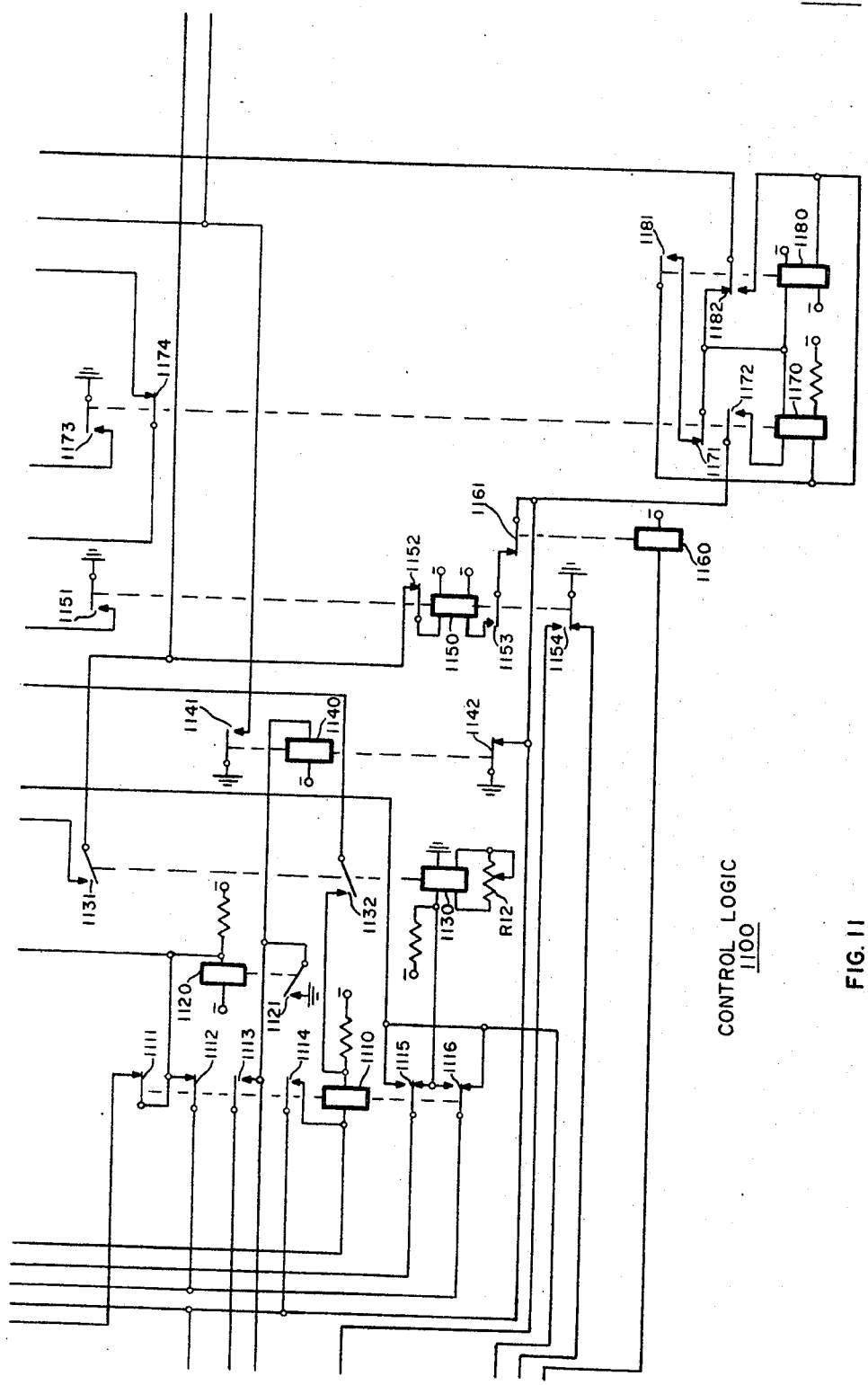
Figure 12:
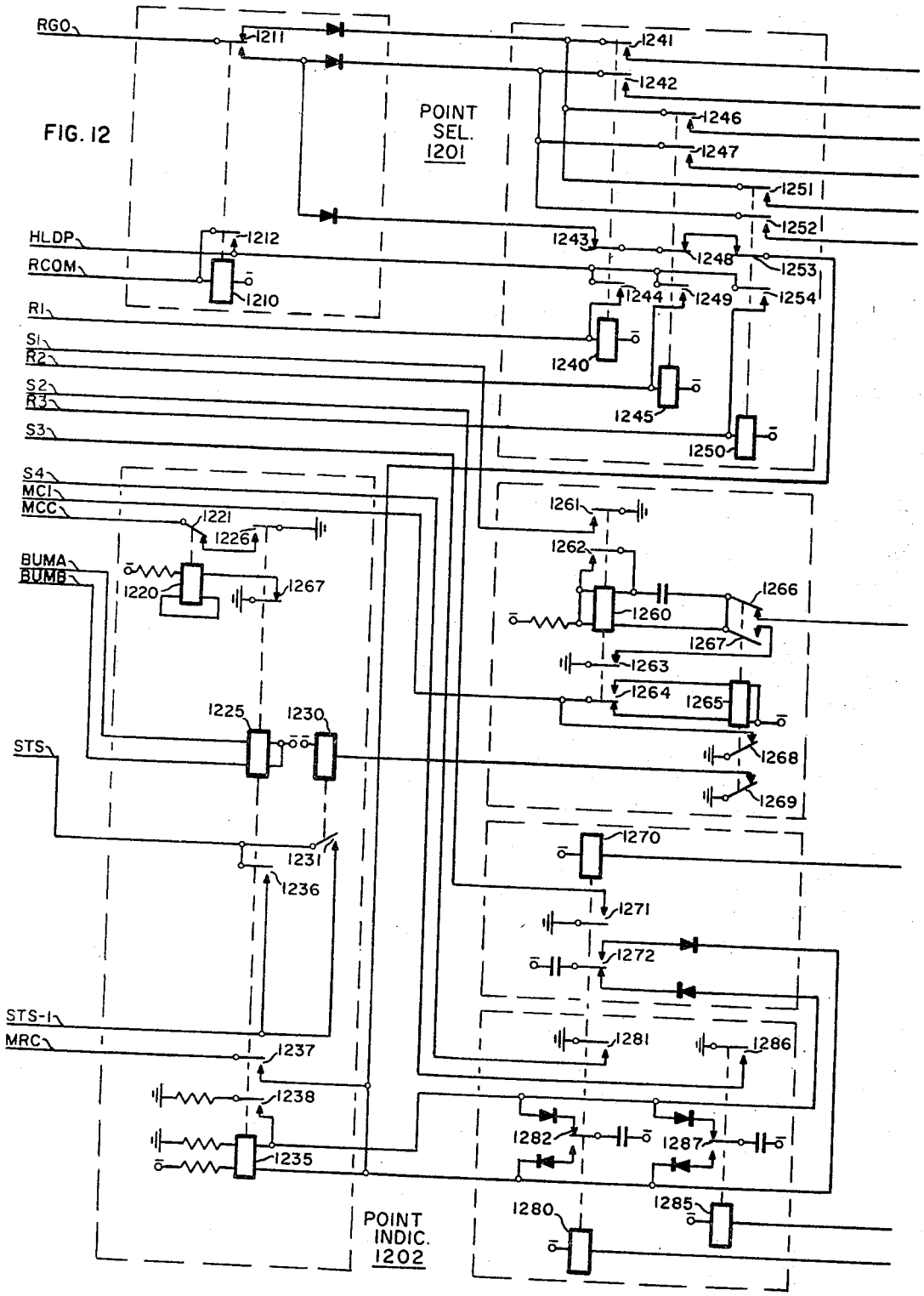
Figure 13:
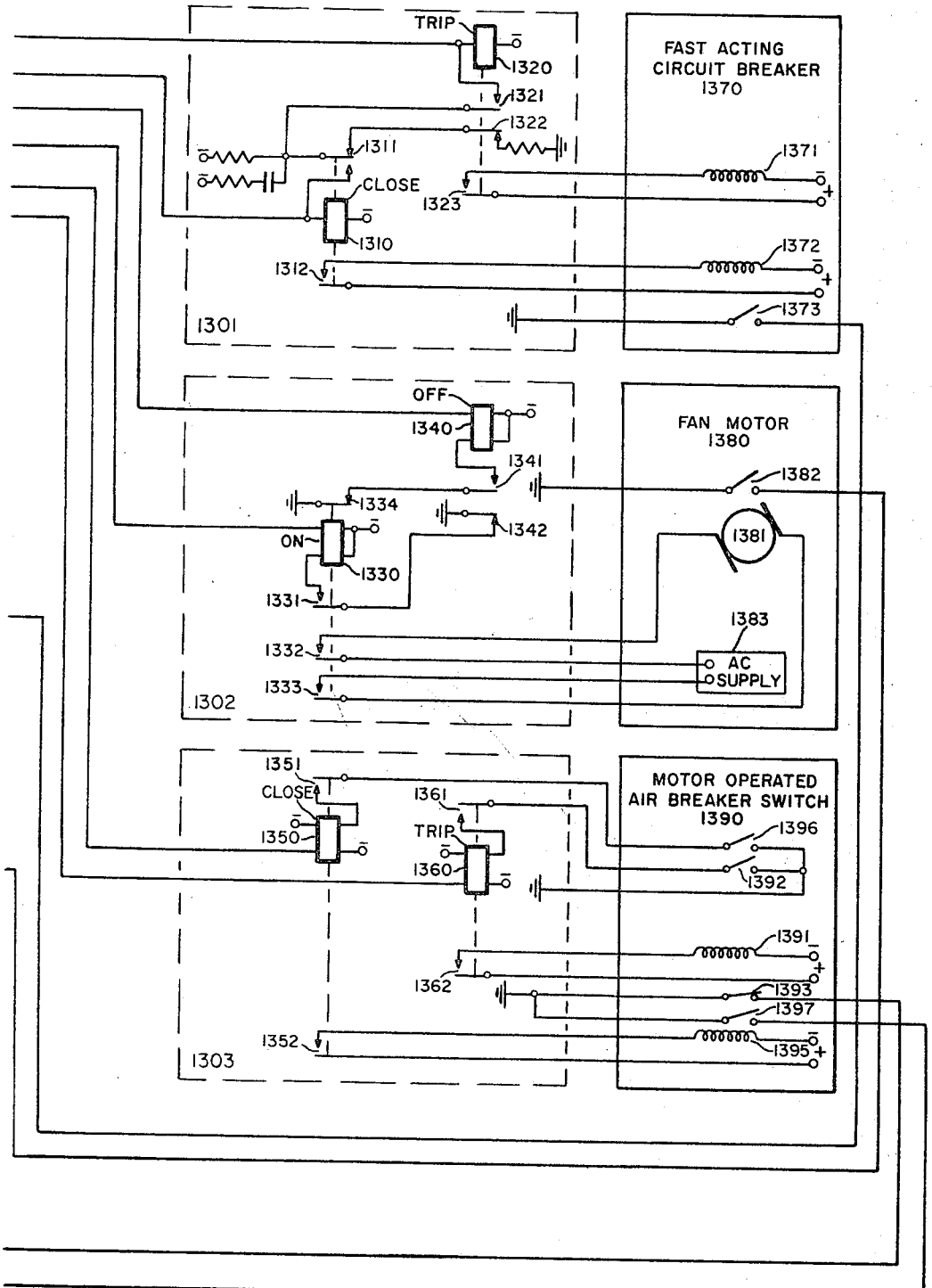

The above-mentioned and other objects and features of the invention and the manner of obtaining them will become more apparent and the invention itself will be best understood by reference to the following description of an embodiment of the invention taken in conjunction with the accompanying drawings comprising FIGS. 1–14, wherein:

FIG. 1 comprises a block diagram of a supervisory control system in accordance with the instant invention;

FIGS. 2–7 comprise a diagram showing the equipment located in a master station for use in the above-mentioned system;

FIGS. 8–13 comprise a diagram showing the equipment of a remote station for use in the instant system;

FIGURE 14 shows how FIGURES 2–13 are to be arranged.

The supervisory system disclosed herein is a quiescent system. Unless a change of status is detected at a remote station or a control command is initiated by the master station dispatcher, the system is inactive. Either of these actions will cause a series of pulses to be transmitted between stations to either report the new equipment status or to control the device selected by the dispatcher. The pulses will convey intelligence by their respective lengths. A long pulse represents such information as "on," "select," "odd parity," and "activate." Short pulses will represent the opposite of these conditions or commands, such as "off," "reject," "even parity" and "cancel." In order to insure adequate distinction between long and short pulses the long pulses are three times the length of the short pulses. The manner in which these pulses are used to convey intelligence is very straight forward. Each time the system either reports a status change or is instructed by the dispatcher to perform a control on a particular device, a series of pulses is transmitted to perform this operation.

The first pulse in a command sequence represents the operation requested by the dispatcher on a selected point. This pulse will be either long or short depending on the nature of the command. The first pulse in a reporting sequence is always a short pulse and is called a "start" pulse. Following the first pulses in each of these sequences is a series of pulses which contain one pulse for each point in the system. If the sequence is for command, each of these pulses will be short except the pulse for the point to be selected. If the sequence is for supervisory reporting, each pulse will represent the current status of a particular point. For example, a long pulse will represent an "on" condition and a short pulse an "off" condition.

The station receiving the series of pulses counts the number of long pulses. After receiving the last pulse of a series, the receiving station will, after a short pause, reply to the sending station with either a long pulse or a short pulse called the "parity" pulse. Depending on whether the number of long pulses received were odd or even, the parity pulse will be either long or short.

The sending station will have also kept track of the number of long or short pulses which it transmitted. If the parity pulses now conform with its stored record, the station will, after a momentary pause, transmit a long pulse instructing the receiving station that the information it received is valid. If the parity pulse did not conform with the record stored, a short will have been transmitted instructing the receiving station to reject the information as invalid. These "parity check" pulses are followed by a momentary "end of message" pause.

The receiving station will perform one final check even after a valid parity pulse has been received. This final check is the comparison of the total number of pulses received, including parity pulses, start pulses, etc., to insure the total number of pulses received is correct. If any of these checks is found to be in error, the entire message is rejected. The message would also be rejected if any pulse or pause was found to be too long or too short during the sequence.

The instant system can supervise and/or control up to 24 remote points. Devices which have three states such as a slow moving valve or motor operated air break switch (open-intransit-close), are considered equivalent to two points when considering the system capacity.

Basically in the supervisory mode the instant system continuously monitors contacts representing the status of each supervised device. Either a normally open or normally closed contact is acceptable to set forth the supervision of any two state device. If the device has three states, contacts must be provided for each of the extreme states. Should a device change state, the system will immediately sense the resulting contact change and report the new equipment status to the master station. Status indications at the master station are not updated one by one as a supervisory report is received, rather they are updated simultaneously when the complete message is received and validated for parity correctness and pulse count. This insures that even if the pulse sequence is faulty because of line noise, the dispatcher will not receive a false display indication.

A dispatcher or operator to exercise a command sequence must first select the desired point, and then press its associated point selection push button before he can exercise control. All point selection push buttons are electrically interlocked to prevent more than one point from being selected at one time. This "select before operate" technique lessens the chance of accidental point operation.

As in the supervisory or reporting mode, the system does not permit any control point to be actually controlled until the complete selection and control sequence has been received and verified. False control operations generated because of line noise or similar faults are thus eliminated.

Referring to the block diagram, the line equipment 600 and 800 consists of frequency-shift-keying tone equipment and polar relays as input (transmitting) and output (receiving) relays. The tone equipment is of the two-frequency type and includes carrier detection circuits to monitor for a channel failure. The transmitter 700 at the master station, and the transmitter 1000 at the remote station consists of groups of reed relays and each includes a prime mover or clock which is used to generate constant speed pulses. The pulses drive the message originating station and at the same time are counted after one or three cycles to form the long or short pulses which are utilized in the message to the receiving station.

The receiver 605 at the master station and the receiver 805 at the remote station consists of groups of reed relays that operate to perform a timing function on the incoming pulse train, timing each received pulse to determine whether it is of long or short duration. Incoming pulses are also extended through the receiver groups to drive the counting chains 400 or 900 and other circuitry in the receiving station.

In a normal message sequence, the originating station would transmit information, stop to receive parity information and then transmit a final command. The initial receiving station of course receives information, then transmits parity information, then receives the final command. The control logic (500 at the master station and 1100 at the remote station) perform this sequence in control and also determine what parity information is to be sent or compared. At the end of a message or at a time out function, due to an impartial or improper message, the control logic will release all circuits in operation and return the system to its quiescent state.

Since information is presented to and taken from the system in parallel form but is transmitted and received in serial form, a parallel to serial and a serial to parallel converter is required. The counting chain 400 of the master station and the counting chain 900 of the remote station perform this function. This is essentially a reed relay scanning device. The counting chain scans all points and then is controlled by the logic circuitry to provide a sequence control to the parity information in the final command.

Each counting chain may be equipped with a minimum of two points or may be expanded to a maximum of 24 points. In the instant disclosure four points are provided.

It may be noted the equipment referred to above is essentially the same at both master and remote stations. Unique to the master station is the point indicating equipment 201, 202 and 203 which consists of indicating lamps, and the audible and visual alarm circuitry 380, which together provide full indication of system status. Also unique to the master station is the point selection equipment 301, 302 and 303, and the common control equipment 390, which consists of the required push buttons and associated equipment to effect the necessary control of the equipment at the remote station. The point indicating equipment at the master station is the individual display equipment for each point in the field accessed and controlled by the remote station. Normally the status of the device is displayed by a steadily burning lamp. A change of status will result in a flashing lamp which will return to a steady condition upon acknowledgment by a point toggle switch.

At the remote station, the point indicator equipment 1202 provides indication of the status equipment associated with the remote station control points.

Before describing the operations required to select and control a remote control point associated with the remote station, a brief description of the function and operation of the command control 390 and display equipment should be given.

The "error" lamp 371 is used to inform the dispatcher that one of the parity or pulse count security checks performed at either the master or the remote station has been found to be in error. The "error" lamp will flash and an audible alarm will sound upon such false occurrence. The flashing lamp and audible alarm can be reset by pressing the "alarm silence" push button 381.

The "on" push button 306 is used to transmit an "on" control. This "on" function could, of course, be "start," "close," or other activate functions. The associated "on" lamp 376 lights momentarily while the command sequence is being transmitted.

The "scan" push button 307 is used to initiate a status check of all remote station points. A "scan" operation would be required, should a supervisory report sequence be received with a parity or pulse count fault. The "scan" feature will be also necessary to update the master station after a sustained master station power failure. Momentary power failures would not require updating since the reed relays used to store the equipment status indications are latched with a permanent magnet and will not restore due to a momentary power shortage. Power failures at the remote station do not require a manual scan to be performed since the remote station will automatically perform a supervisory report sequence upon restoration of power.

The "alarm silence" push button 381 is used to reset the system audible alarm. The "alarm silence" push button is also used to restore the "error" lamp 371 after a parity or pulse counting error has been detected. The "alarm" lamp 379 will flash while the audible alarm is sounding.

The "cancel" push button 308 is used to reset points which have been selected for control by the dispatcher but not actually activated.

The "off" push button 305 has a similar function to the "on" push button 306. The "off" push button is used to transmit the activate commands such as "stop," "close," or "trip." The "off" lamp 375 lights momentarily while the command sequence is being transmitted.

The operations required to select and control a remote field device are quite straight forward. For example, let us suppose the dispatcher desires to close fast acting circuit breaker 1370. The dispatcher first presses key 301. Associated lamp 374 will immediately light to verify the selection.

The dispatcher then presses the "on" push button 306, its associated lamp 376 lights momentarily during the command sequence transmission. After transmission both lamps will extinguish. Assume that circuit breaker 1370 received the command without error and closes. The system will now immediately report the status change and initiate a reporting sequence. If the report is received without error, the "on" lamp 293 associated with the point indicating equipment 201 will begin to flash and an audible alarm will sound. The dispatcher would silence the audible alarm by depressing the alarm silence key 381 and operate agreement key 219 to shift "on" lamp 293 from the flashing to the steady state.

An overall view of the system and interconnection of equipment can be obtained by the following description of the typical reporting sequence. Any change of status of a monitor device included in the remote control points 1370, 1380 or 1390 will then instruct the remote station to originate a scan of all points. At this time, the control logic circuitry 1100 will prepare all circuits for this particular sequence. The remote station will switch to the transmit mode, starting the transmitting equipment 1000 and advancing the counting chain 900. The counting chain will scan past all information provided by the remote control points 1370, 1380 and 1390, through the point indicating equipment 1202 and generate either a long or short pulse depending upon the status of the devices being monitored.

The master station being in the receive mode would be driven by the incoming pulses from the remote station. Its receiver circuit 605 would detect long or short pulses and channel this information to the appropriate point indicator equipments 201, 202 or 203 via the counting chain 400. No change in display takes place at this time since only paths to the appropriate point indication equipment are established at this time. After scanning the point information, the remote station would start into the logic portion of the chain. Here it pauses, then switches to the receive mode waiting for parity information to be transmitted from the master station.

As the master station counting chain 400 is driven into the logic phase of its operation, it would transfer to the transmit mode and send the required parity information. That is, a long or short pulse depending on the parity count up to that time. After sending this information the master station will return to the receive mode and wait for the final "go" or "no-go" command.

Upon receiving parity information, the remote station would make a comparison of the data indicated, transfer to the transmit mode, send the appropriate "go" or "no-go" command, then return to the receive or quiescent mode with all circuits released.

If the final command received at the master station were a long or "go" pulse, the point indicating equipment previously prepared would be energized, updating the panel indication and releasing all circuits. If a "no-go" command were received no change of indication would occur and the system would restore itself to the quiescent condition.

Operation of the system is best understood by following its operation during initiation and completion of the command sequence and operation during a reporting sequence from the remote to the master station. Referring first to the master station diagram consisting of FIGURES 2, 3, 4, 5, 6 and 7 taken in combination, the master station operation will be described in connection with the initiation of a command sequence.

For the purposes of description, it will be assumed first that the field control point associated with push key 301 will be advised to operate its associated equipment. The operator will select the point to be controlled first by operating key 301. This operation will cause ground to be extended through contacts 553 to the holding positive bus, to the strap extending to contacts KK on key 301. Then through key 301, upper wiper to contact K and from thence to relay 340. Likewise battery will be extended through 552 and the holding minus bus to contacts C, CC, G, GG, L and M, and from there to the coil of relay 340. Completion of this circuit path will cause relay 340 to operate locking to ground at its contacts 341 and extending ground through contacts 342 to operate lamp 374, giving the operator an indication that selection has been made. Ground is then extended through contacts 343 to contact 413 to prepare the counting chain circuit.

The operator will now operate key 306 to turn on the devices associated with the selected remote field position. Ground will be extended through contacts 366 and key 305 contacts N and NN, to contacts of "on" key 306 and then through the associated strap to contact R, and the wiper of key 306 to contact RR and then to the coil of relay 350. Relay 350 is connected at the other side to the holding minus bus which extends to battery at contact 552. Relay 350 will now operate extending ground at contact 351 to lamp 376 to give an "on" indication. Relay 350 locks at contacts 352 to ground. Operation of relay 350 completes a circuit path from ground through contacts 424 at its contacts 354 to the lower winding of relay 365. Relay 365 will operate locking to the holding positive bus at its contact 367, removing ground at contact 366 from the "off," "on" and "scan" keys 305, 306 and 307 respectively. Further operation will render the operation of the "off," "on," and scan" keys ineffectual. The initial operation started by depression of the "on" key, provides an electrical interlocking arrangement. At contacts 353, ground will be extended to contact 412 of the transfer relay for further operation. Ground extended at connections 354 as well as being extended to the lower winding of relay 365 is extended via contact 531 to the upper winding of relay 540, causing it to operate.

The operation of relay 540 extends ground at contacts 541 to relays 410 and 490 simultaneously causing them to operate, thus placing the master station in the transmit mode. Relay 540 will lock to holding ground extended to contact 532 at its contact 543. Ground will also be extended at contacts 544 to the prime mover 710 which functions as a pulse source during the transmitting operation. As long as ground is present over this path, relay 710 periodically operates to produce output pulses at its contact 711 at a rate determined by the setting of the rheostats R6 and R7.

Ground extended through contact 733 will be extended through the counting chain relays over path extending through contacts 491, 486, 471, 461, 441, and 432 to the relay 420, causing it to operate and lock to ground at contact 422. Operation of relay 420 will extend holding ground from a path extending over contacts 353 and 412, at its contacts 423, through the counting chain at contacts 434, 428, 443, 453, 463, 448, 473, 483, 488 and 493 to relay 720 causing it to operate.

On the occasion of the next pulse produced by prime mover 710, after relay 720 is operated ground will be extended through contacts 711 and 721 and 732 to relay 740 causing relay 740 to operate. The same ground extended to relay 740 is also extended through contact 757 to relay 755 also causing it to operate locking to ground at its contact 758. When relay 755 operates, ground at contact 756 is extended to the polar relay 690 causing it to operate at its contact 691. This will be effective to start transmission of the first outgoing message pulse through the RFL tone equipment 601 to the remote station. This pulse will continue to be transmitted as long as relay 690 is operated in this position.

When relay 755 operated, it transferred the operating path over which it was originally operated at contact 757 to relay 750 by way of contact 752. When the next pulse occurs from the prime mover 710, relay 750 will operate locking to ground at contact 753. After relay 750 operates, it will shift the operating path at its contact 752 to relay 745. When relay 420 operated, the marking ground which was extended to the counting chain at its contact 423 and thence through 434, 428, 443, 453, is also conducted through contacts 464, 751, and 771 contacts 449 and 512 to relay 510 of the parity count relays causing it to operate. When relay 750 operated, it broke this holding path at contact 751. Relay 510 and relay 520 will now operate in series.

When the prime mover 710 produces the next pulse over the previously outlined operating path, it will be conducted to relay 745 which will operate and lock to ground at its contact 747. At contact 748, ground will be extended through contact 717 to relay 730 which will operate at this time. Operation of relay 730 will complete the first outward transmitted pulse by shifting the operating path of the outward transmitting chain at contacts 732 so that relay 725 is caused to operate. Operation of relay 725 will remove ground at contacts 726 from relay 745, 750 and 755 causing them to fall thus removing ground at contact 756 and 749 from the polar relay 690 whereby it will switch to its alternate state to start transmission of an outgoing signal of opposite polarity.

Operation of relay 730 will also extend ground coming through contact 765 and contact 736 to the counting chain relays where it will be conducted through contact 492, 481, 446, 451, and 426 to relay 430 causing it to operate and lock at its associated contact 433. When the next pulse from prime mover 710 is produced at contact 711 it will be conducted through contact 721 to relay 720 which is still maintained operated, and through contacts 732 and 776 to relay 775 causing relay 775 to operate and lock at contact 777. In response to this action the operating path will be transferred to contact 776 through contact 772 to relay 770 which will operate until the next pulse is produced by prime mover 710 causing it to lock at its contact 773. Likewise when relay 770 operates, the path to the parity relays 510 and 520 will be broken at contact 771 causing relay 510 to release and then in sequence relay 520. Relay 770 then transfers the operating path at its contact 772 to relay 760. Relay 760 will operate locking to ground at contact 763 and extending ground at contact 764 to contact 718 of the upper winding of relay 715. Relay 715 was operated and relay 745 was restored to normal. Extension of this ground will be effective to maintain relay 715 but to allow relay 730 to restore. Relay 730 restores when the next pulse is received from the prime mover. Relay 730 will operate removing the holding ground from relays 760, 770 and 775 causing them to restore. This will also open the holding path for relay 715 at contact 764, causing it to restore. Relay 425 will now operate over ground extended through contacts 733, 491, 486, 471, 461, 441, and 432, causing it to lock to ground at contact 427. When relay 425 operated the holding path for relay 720 was broken at contacts 428 because ground is not present at contacts 414.

These contacts 414 are associated with the marking of the second field point, which was not a selected point. With relay 720 restored the next pulse produced by the prime mover will be conducted through contacts 711, 721 and 731 to the upper winding of relay 745. Relay 745 will operate locking to ground at contact 747 and at contact 749 extending ground to the polar relay 690 causing it to again reverse state and transmit another pulse. Ground is also extended at contact 748 to contact 717 and to relay 730. Relay 730 will operate. The operation of relay 730 again transfers the operating path to relay 740 from relay 725 causing relay 740 to restore and relay 725 to operate. At the same time ground extended through contact 765 will be further extended at contact 736 to the counting chain and through contacts 492, 481, 446, 451 and 426, it will be conducted to relay 440, causing relay 440 to operate and lock to ground at its associated contacts 442. The operation of relay 725 can be effective to remove holding ground from relay 745 at contact 726 causing it to restore and upon its restoration removal of ground at contact 749 will cause the polar relay 690 to again reverse its state. Removal of ground at contact 748 when relay 745 restored also caused relay 715 to operate in series with relay 730. The next pulse produced by prime mover 710 will be effective to cause relay 760 to operate over a path extending from ground through contacts 711, 721, 731, relay 760 will operate and lock to holding ground at its contact 763. Operation of relay 760 extends ground at contact 764 to relays 715 and 730, and causes relay 730 to restore but hold relay 715 operated. Restoration of relay 740 will also transfer the operating path to relay 740 which in turn when the next pulse is received from the prime mover will operate to remove the holding ground at contact 741 from relay 760 and cause it to restore and remove the holding ground at contact 764 to cause relay 715 to restore.

The restoration of relay 730 will cause a ground to be extended at contact 733 to the counting chain through contacts 491, 486, 471, 461 and 441 to the coil of relay 450, causing it to operate and lock at contact 452. No marking is present at the make spring of contact 453, so relay 720 is not reoperated on the occasion of the next pulse from prime mover 710.

In a manner similar to that described previously, the closure of ground at contact 748 will cause relay 730 to operate and cause 725 to operate and 740 to restore and also by removal of ground in response to operation of relay 725, and the removal of ground at contact 726 will cause relay 745 to restore. This restoration in turn will remove ground at contact 749 again causing the polar relay 690 to change states. Also operation of relay 730 will extend holding ground through contacts 765, 736, 492, 481, 446, and 451 to relay 460 causing relay 460 to operate. Removal of ground at the contacts of relay 748 will cause relay 715 and 730 again to be held up in series. Ground will now be extended by the next pulse of the prime mover to the upper winding of relay 760.

When relay 760 operates, holding ground is extended through contacts 489, 476 and 467 to contact 478 and then through contact 496 to relay 580 causing relay 580 to operate. Relay 580 will lock to ground at contact 584 and will extend operating ground at its contacts 585 through contacts 449 to the coil of relay 570 in an attempt to cause relay 570 to restore. However, relay 570 is slow to release and will not release unless this condition will continue to be present for a period of 200 milliseconds. The same ground is however also extended through contacts 585 and contact 766 to relay 530 causing 530 to operate.

In response to operation of relay 530, the master station will be transferred from the transmit to the receive mode as follows: Operating paths to relay 540 will be broken at contacts 531 and 532 causing it to restore. Restoration of relay 540 will remove operating ground from the prime mover 710 at contacts 544 and remove ground at contacts 541 from relays 410 and 490 causing them to restore. Restoration of relays 410 and 490 will complete the transfer of the master station to the receive mode. Restoration of relay 710 also prevents further operation of relays 725 and 740, so they will restore as will relays 730 and 715.

At this time, the proper response from the remote station must be received before the transmission is completed. The proper pulse returned by the remote station should be the short pulse complement of the long pulse originally transmitted by the master station.

Receiving this pulse from the RFL tone equipment 601 will cause a change in the state of polar relay 680. In response to this action, relay 670 will be operated locking to holding ground at contact 672, that extends from a path back to contact 411. Operation of relay 670 will remove ground at contacts 673 and 674 from relay 650 and 660 respectively so that these relays will now attempt to perform a time out function. However, the same extension of ground to relay 670, also is extended to relay 630 causing it to operate and extend ground at its contact 631 to relay 650 to maintain it in the operated condition. Operation of relay 630 will also be effective to extend holding ground at contact 632 through contacts 612, 491, 486, 471 and 461 to relay 445 causing it to operate locking to ground at contact 447. The operation of relay 445 effectively will check the parity condition indicated by relay 610 by attempting to complete a path from ground through contacts 614, 493, 488, 483, 473, and 448 as well as 494, 449, to the parity check relays 510 and 520. However, relay 610 is not restored and ground was not extended at contact 614.

A second incoming pulse from the remote station received at the master station will cause a second reversal in state of the polar relay 680 to conduct at its contact 681, operating ground to relay 620 through contact 671. Operation of relay 620 will extend ground at contact 621 to prevent the timer relay 660 from timing out and extend ground at contact 622 to relay 470 through a path extending through 613, 492, 481, and 446. Relay 470 will operate locking to ground at its contacts 473, completing the parity checking path at contact 473.

Operation of relay 470 will remove the operating ground at contact 476 that has been extended to relay 570 removing its conditioning and also removing the ground effectively from relay 530 causing it to restore. It will be extended at contact 476 through contacts 586 to relay 560. As long as no further pulses are received, after a period of 200 milliseconds relay 560 will operate extending a path from ground through contacts 468 and 561 and 531 to the upper winding of relay 540 causing relay 540 to reoperate and extend ground at contacts 541 to the transfer relays 410 and 490. Ground will also be extended by operation of relay 540 at contacts 544 to prime mover 710 to prepare again for further pulsing. Operation of relay 410 will remove the holding ground at contacts 411 that has been maintaining relay 670 in the operated condition. Relay 670 will thus restore, and the receiving circuitry will restore to normal.

With the operation of relay 470 and 490, ground was also extended through contacts 733, 491, 486 and 471 to relay 480 causing relay 480 to operate and lock to ground at its associated contacts 482. Ground will now be extended through contacts 477, 521, 417 to the counting chain at contacts 483 and from there through contacts 488 and 493 to the relay 720 causing relay 720 to again operate. Operation of relay 720 at the occasion of the next pulse from the prime mover will transmit a pulse through contact 721 to relay 740 causing it to operate and likewise relay 755. Operation of relay 755 will transmit an outward pulse by application of ground at contact 756 to the polar relay 690 which will again reverse its state.

Another pulse will be extended through the operated contacts of relay 755 and contact 752 to operate relay 750 on occasion of the next pulse from prime mover 710. The operating path is then extended through contacts 752 to relay 745. Relay 745 will then operate locking to ground at contacts 747 and extend ground at contacts 748 to relay 730 causing it to operate in a manner previously described. This operation effectively times the next pulse to cause relay 740 to release and relay 725 to operate, removing operating ground from polar relay 690 causing it to again reverse its state after a transmission of a long pulse, further causing ground to be extended at contact 736 through contacts 492 and 481 to the coil of relay 485.

Relay 485 will operate locking to ground its contacts 487. At its associated contacts 489, it will extend ground to contact 761. When the prime mover 710 produces its next pulse relay 760 will operate at a path extending back through contact 731 and 721 so that when contact 761 closes, the ground extended to that point will be further extended through contacts 583 to relay 530 causing relay 530 to operate. Relay 530 upon operation will remove battery from the holding battery bus at contact 552 and ground from the holding ground path at contact 553 so that all relays presently held operated over the holding ground and holding battery paths are restored to normal and return the system to the quiescent state, to await the transmission of a report from the remote station or initiation of another command by the operator at the master station. Obviously when holding ground is broken relay 760 will be included in those that restore and subsequently the release relay itself will restore but in the meantime other relays will have been restored to their normal states.

Operation of the master station during the course of receipt of information reporting from the remote station is as follows.

In response to receipt of incoming signals from the remote station polar relay 680 will reverse and conduct, extending holding ground at its contact 681 to the upper winding of relay 670 causing it to operate. Relay 670 will then lock at contact 672 and complete an operating path for relay 620 at contact 671. Ground will also be removed at contact 673 and 674 from the two timing relays 650 and 660 respectively. At the same time that relay 670 operated relay 630 also operated and at its contacts 631 returned ground to the timer 650 causing it to remain operated. With no ground present on its upper winding timing relay 660 will start to time. If no additional pulses are received after a period of 200 milliseconds relay 660 will then drop. Operation of relay 630 extends ground at contact 632 over a path extending through contacts 612, 491, 486, 471, 461, 441 and 432 to the coil of relay 420 causing it to operate locking to ground at its associated contacts 422. At contacts 421 ground will be extended to relay 320 causing it to operate locking to ground at its associated contacts 322 and further extending operating ground to relay 315. Operation of relay 315 will extend ground at contacts 316 to buzzer 370, which will sound an audible alarm so that an operator is made aware of the presence of an incoming report. At the same time a path is also completed at contacts 323 from the flasher 310. This flasher is constantly running and periodically provides a ground over the flashing lead at its contacts 311. This ground extended through contacts 323, will periodically cause alarm lamp 379 to flash and provide a visual indication of an incoming signal from a remote office.

The incoming message to be received from the remote station is to indicate that the first point is in the "on" condition. Such a message would be transmitted in response to the turning on of the equipment associated with point one, as was outlined in connection with the transmission of a message from the master station to the remote station. As indicative of this condition the second incoming pulse from the remote station will be a long pulse. Receipt of this incoming pulse will cause polar relay 680 to reverse removing ground at contact 681 from relay 630 and extending this ground to relay 620 will extend ground at contact 621 to the timer 660 causing it to fully restore to normal and stop its timing function, however the removal of ground at contact 631 will cause the timer 650 to start timing.

The operation of relay 620 will cause ground to be extended at contact 622 through a path extending over contacts 613, 492, 481, 446, 451, and 426 to the coil of relay 430 causing it to operate locking to ground at its associated contacts 433. Operation of relay 430 will effectively break the ground to the alarm circuitry of contacts 431, however the alarm buzzer 370 and the associated alarm lamp 379 will continue in their "on" conditions unless the operator removes battery by operation of push key 301.

Inasmuch as this second pulse received from the remote station is of long duration, timer 650 will restore breaking the operating path for relay 610 at its associated contact 651. Relay 610 will not restore and at its associated contact 614 will extend ground via contacts 493, 488, 483, 473, 448, 463, 453, 443, 428 and 434 through contact 413 to relay 225 in the individual equipment associated with the point transmitting the "on" condition. Relay 225 will operate locking to ground at contacts 227. Likewise the release relay 610 will cause relay 640 to start timing. If after a predetermined period an incoming pulse from the remote station is not received to reoperate relay 610 and subsequently relay 640, relay 640 will release and at its contact 641 apply ground to relay 550 which would cause it to release removing holding battery and holding ground at contacts 552 and 553 from all the relay circuitry in the master station. As such this may be the case if improper information were available or there was some other fault or defect in the remote station operation.

The same ground extended to relay 225 is also extended through the chain at contact 464 and then through contacts 751 and 771 through contacts 449 to the parity check circuit to cause operation of relay 520. Assuming proper operation at the remote station the third incoming pulse from the remote station will be received. This pulse is again of the short form and as a consequence relay 640 will reoperate, the timer 660 will start timing, relay 620 will release and timer 650 will reoperate. Relay 610 will now reoperate and in turn will reoperate relay 640. The reoperation of relay 610 will remove ground at contact 614 from the previously outlined chain and as a result the ground extended to parity check circuit will be removed at contact 512 causing relays 510 and 520 to remain operated and locked in the operated position in series. The reoperation of relay 630 also causes ground to be extended at contact 632 over a path extending through contacts 612, 491, 486, 471, 461, 441, and 432 to relay 425. Relay 425 will operate locking to ground at its associated contacts 427.

A fourth incoming short pulse from the remote station will be received and cause relay 680 to reverse its position removing ground at contacts 681 from relay 630 causing it to restore and reoperating relay 620 in turn timer 660 will be fully restored and timer 650 will start timing. The reoperation of relay 620 will extend ground at contacts 622 over a path extending through contacts 613, 492, 481, 446, 451, and 426 to the coil of relay 440 causing it to operate locking to ground at its associated contacts 442. Receipt of a fifth incoming pulse will cause relay 680 to again reverse reoperating relay 630, restoring relay 620 and in turn causing timer 660 to start timing and fully restoring timer 650. By reoperation of relay 630, ground is extended via contacts 612, 491, 486, 471, 461, and 441 to the coil of relay 450 causing relay 450 to operate locking to ground at its associated contacts 452. A sixth incoming pulse will as before cause polar relay 680 to reverse itself and in turn restore relay 630 and reoperate relay 620 and cause the timing function to again reverse with timer 660 restored and timer 650 timing. Ground extended through contact 622 is further extended through contacts 613, 492, 481 and 446 and 451 to the coil of relay 460 causing it to operate and lock to ground at its associated contacts 462.

The operation of relay 460 extends ground at its contacts 467 to a path extending through contacts 489, 476, 467, 478, and 585 to the upper winding of relay 560. After a predetermined period of time, relay 560 will restore.

Restoration of relay 560 will extend ground to a path through contacts 468, 561, and 531 to the upper winding of relay 540 causing relay 540 to operate. Relay 540 in operating will lock to ground at its associated contacts 543 and at its associated contacts 541 extend ground to the transfer relays 410 and 490 placing the master station in the transmit mode. Relay 540 will also extend ground at its associated contacts 544 to the prime mover 710 to cause it to start pulsing. Transfer to the transmit mode will cause relay 670 and 620 to restore and accordingly relay 650 to operate fully. Operation of relay 490 is effective to complete a path from ground through contacts 733, contacts 491, 486, 471, and 461 to the coil of relay 445 causing it to operate locking to ground at contacts 447. Operation of relay 445 will cause ground from the parity circuit to be extended through contacts 522, 466, 494 to be further extended through contacts 448, 473, 483, 488, and 493 to relay 720 causing relay 720 to operate. Upon receipt of the next pulse from the prime mover, relay 740 will operate as will relay 755 over a path outlined previously.

Operation of relay 755 will extend ground at its contacts 756 to the transmit mode relay 690 causing it to reverse and control the outgoing tone equipment to send a pulse to the remote station. The outgoing pulse must, because of the parity indication, be a long pulse and consequently on the occasion of the next pulse from prime mover 710, relay 750 will be operated in response to the next pulse and relay 745 will be operated in a manner described previously. Upon operation of relay 725 ground will be extended at contacts 748 through contacts 717 to relay 730 causing relay 730 to operate. In response to the operation of relay 730, relay 740 will restore. Relay 725 will operate and ground will be extended to contact 736 over a path extending through contacts 492, 481, and 446 to the coil of relay 470 causing relay 470 to operate locking to ground at its associated contacts 473. Operation of relay 470 will remove operating ground from relay 720 at contacts 473. When relay 725 operated, the holding ground was removed at contacts 747, 753, and 758 from the lower windings of relays 745, 750 and 755 respectively causing them to restore. With relays 745 and 755 restored, ground is removed at contacts 749 and 756 causing the polar relay 690 to reverse and transmit the next pulse to the remote station. Furthermore restoration of relay 740 removes ground at contacts 748 causing relay 715 to operate in series with relay 730 over a path extending from ground through contact 735 and the lower winding of relay 715 and the lower winding of relay 730 to battery.

The next pulse from prime mover 710 will be extended through relay 760 causing it to operate locking to ground at its associated contact 763. Operation of relay 760 will complete an operating path at contact 766 for relay 530. Contacts 764 extend ground via contact 718 to the upper winding of relay 730 which is in opposition to the lower winding over which it is presently held operated. Presence of potential on the upper winding will cause the two potentials to effectively cancel each other whereby relay 730 is restored and relay 715 is held operated over its upper winding.

When relay 530 is operated relay 540 will have its operating path broken at contacts 531 and 532 whereby it will be caused to restore. When relay 540 restores, ground will be removed at contacts 541 from relays 410 and 490 causing them to restore and placing the master station again in the receive mode.

In response to receipt of the proper pulses from the master station the remote station will now again transmit additional pulses to complete the reporting sequence. The first incoming pulse from the remote station will cause polar relay 680 to reverse applying ground to relay 670 causing it to operate in a manner previously described. Relay 630 will also operate and timer 660 will start a timing function.

Operation of relay 630 will extend ground over a path extending through its contacts 632 via contacts 612, 491, 486, and 471 to the winding of relay 480 causing it to operate, locking to ground at contacts 482. Operation of relay 480 will prepare an operating path at its associated contacts 488 to the indicator equipment. The first pulse received from the remote station in this instance is of a long duration so after a predetermined period, timer 660 will time out and cause relay 610 to release for timer 640 to start timing. When relay 610 releases ground is extended via contacts 614, 493, 488, and 483, through contacts 417 to the RGO lead and from thence to the indicator equipment. Since the equipment that is operated is associated with the first point this ground is conducted through contacts 226 and 223 to the lower winding of relay 210 causing it to operate, locking to ground at contacts 213 further extending this ground at its contacts 214 to relay 220 causing it to operate, locking to ground at its associated contacts 224. As will be noted ground via lead FL is periodically provided from flasher 310 to "on" lamp 293 indicating that the equipment associated with the first point is in the "on" condition. This lamp will continue to flash until such time as the operator operates key 219 removing the holding ground from relay 210 after which steady ground at contacts 211 will be applied to lamp 293. Since the equipment associated with point 3 is not reporting an on or operating condition extension of ground via lead RGO to the indicating equipment for the third point cannot provide any indication at that point.

Receipt of the final pulse from the remote station will restore polar relay 680 to its initial position, removing ground from relay 630 causing it to restore and in turn operating relay 620. In turn timer 660 will be operated fully and timer 650 starts a timing function. The operation of relay 620 will extend ground at contact 622 over a path extending through contacts 613, 492, and 481 to the winding of relay 485 causing relay 485 to operate locking to ground at its associated contacts 487. When relay 485 operates ground will be extended over a path extending through contacts 489, and 581 to relay 550 causing it to operate. Operation of relay 550 removes both holding ground and holding battery at contacts 553 and 552 respectively from the holding paths thus releasing all relays in the system presently held, and therefore returning the master station to the quiescent state, so it may wait for further reports from the remote station or the initiation of a command by an operator at the master station.

Remote station operation

The following is a description of the operation of the remote station which is shown in FIGURES 8, 9, 10, 11, 12 and 13. There is a distinct similarity between portions of the master station and the remote station. Those portions of the remote station that correspond to similar portions in the master station will not be treated in detail but will rather be discussed in more general terms. These portions are the line equipment 800 and receiver 805 of FIGURE 8 which correspond to similar equipment shown in FIGURE 6 at the master station, the transmitter 1000 shown in FIGURE 10 which corresponds to that shown in FIGURE 7 of the master station, the counting chain 900 of FIGURE 9 which corresponds to the counting chain shown in FIGURE 4 of the master station, and the control logic and parity circuits of FIGURE 11 which correspond to similar circuitry disclosed in FIGURE 5 associated with the master station.

It is understood that the fast acting circuit breaker 1370 is the first point which was selected by the master station. Initiation at the master station of the proper command functions will cause operation of the fast acting circuit breaker to its closed position.

The first incoming signal from the master station at the tone equipment 801 will cause operation of the receive polar relay 810. This will act upon the receiver in a manner similar to that disclosed in connection with the master station, to control the counting chain and ultimately operate relay 905. The first pulse to be received will be a long pulse. Relay 890 will ultimately operate in a manner similar to that described in connection with relay 610 of the master station, and at contacts 894 extend ground through the counting chain, and because of the operation of relay 905, further extend it to operate relay 1210. Relay 1210 will operate locking to ground at its own contact 1212 and prepare a path for operation of the indicating equipment at the master station at contact 1211. The second pulse received from the master station will also be of long duration and consequently after relay 985 operates holding ground will again be extended by relay 890 at its contacts 894 through the counting chain at contacts 1088, and will be further extended through contacts 993 and lead R1 to relay 1240 locking to ground at associated contacts 1244 at its contacts 1242 to complete the selection of the desired point to be controlled at the remote station. However, the lack of presence of a signal on the RGO lead at this time will prevent the operation.

Subsequently, additional short pulses will be received. The receiver of FIGURE 8 will extend these pulses to the counting chain (FIG. 9) whereby relays 980, 970, 960 and 950 will subsequently be operated. At this time a transfer to the transmit mode occurs in a manner similar to that explained in connection with the master station. In this sequence, the prime mover 1090 will be actuated, and through the transmitter will provide the necessary outpulses to operate polar relay 820 which in turn will control the RFL tone equipment 801 to transmit the responsive signal information required at the master station.

An indicated previously, when the remote station responds properly the master station will then complete the proper transmission. The remote station will again switch to the receive mode during which time additional pulses received will advance the counting chain to finally operate relay 925 and the chain will be completed to lead RGO at contact 928 and since the incoming pulse that renders relay 925 operated is of long duration, ground will be applied over the lead by relay 890 at the associated contact 894. The extension of this ground over lead RGO via contacts 1211 and 1242 will cause the operation of relay 1310 associated with the fast acting circuit breaker 1370. Relay 1310 will operate and lock at its contacts 1311 for a short period of time extending positive potential at contacts 1312 through to close solenoid 1372 causing it to operate and close the circuit breaker 1370. When this operation is completed contacts 1373 will close and extend ground back to relay 1260 to assist in providing an indication of the status of the fast acting circuit breaker 1370.

If the circuit breaker 1370 had been in the closed or operated position and the operator had observed an indication of such at the master station and for some further reason decided to trip the fast acting circuit breaker, the command transmitted from the master station would have been to turn the first remote field station (in this case the fast acting circuit breaker 1370) off. This would have been accomplished by operation of key 305 at the master station. Key 305 causes the first pulse to be transmitted from the master station to be a short pulse. As a consequence of the first command pulse being of short duration, when received at the remote station, relay 1210 would not have been operated, and consequently, the ultimate operating ground extended over lead RGO would have then been extended through contacts 1241 rather than 1242. This extension of ground through contacts 1241 would be effective to operate relay 1320 associated with the circuit breaker and effectively close the operating path through the "trip" solenoid 1371 of the circuit breaker 1370 causing the "trip" solenoid to operate and trip the circuit breaker, at the same time opening the contacts 1373 to provide the appropriate indication back to the master station.

The return of signals from the remote station to the master station to indicate the status of equipment such as circuit breaker 1370, fan 1380 and the motor operated air breaker switch 1390 will be described as follows: When the "A" contact 1373 of the circuit breaker 1370 is closed, a ground is extended through contacts 1266 to the lower winding of relay 1260. Relay 1260 operates extending ground to the S1 lead at the contact 1261, preparing a holding path from ground at its contacts 1263. The operation of relay 1260 causes relay 1265 to restore. When relay 1265 restores ground will be removed from relay 1230 at contacts 1269 to complete an operating path to relay 1150 at contacts 1231. Operation of relay 1150 will place the remote station in the transmit mode and also actuate the counting chain 900 so that a complete train of pulses will be transmitted to the master station indicative of the status of all the remote points associated with the remote station. Since in this particular instance, only fast acting circuit breaker 1370 has been operated to the closed position, a marking is present only on lead S1. When the S1 lead is interrogated, a long pulse will be transmitted and acknowledged accordingly at the master station. If other changes have occurred the other S leads would have become marked or unmarked depending upon the circumstances and these indications too would be transmitted to the master station.

It is to be understood that after the performance of a command function initiated by the master station has been completed, and a desired remote point associated with the remote station has been operated a scan of all points is made. This provides an updated indication of the status of all points. Likewise, if a change were to occur without initiation of a command by the master station, operation of relays such as 1260, 1270 or 1280 would occur. Subsequently, either the release of an individual memory relay such as 1230, or operation of the common memory 1235 will cause the remote station to be placed in the transmit mode and a complete scan of all remote points will be performed.

If the operator of the master station wishes to initiate a scan of the points associated with the remote station, he need only operate the scan key 307. Operation of key 307 will operate relay 355 providing a visual indication of this operation at lamp 377, and at contact 358, provide a marking on the scan lead at contacts 412, and at contacts 359 complete a path from ground through contacts 531 to upper winding of relay 540 placing the master station in the transmit mode thus actuating the transmitter 700 and starting operation of the counting chain 400. Because of the marking on the scan lead at contacts 412, the counting chain will cause the first pulse to be transmitted by transmitter 700 through the polar relay 690 and the tone equipment 601 to be a long pulse. Since only the first pulse generated at this time will be of long duration, relay 1210 will be operated at the remote station. None of the point selection relays such as 1240, 1245, and 1250 will be operated. Accordingly, when the transmission is completed and the counting chain operation at the remote station is effective to place a go ahead signal on the RGO lead by virtue of operation of relay 925, the signal will be extended through contacts 1211, 1243, 1248, and 1253 to operate relay 1235. Relay 1235 will complete an operating path to relay 1150 at contacts 1236. In a manner similar to that previously described relay 1150 will cause the remote station to transfer to the transmit mode, and the scan operation will start indicating the current status of all points associated with the remote station.

What is claimed is:

1. A supervisory control system including a master station, a remote station including a plurality of remote control points, and a communication link between said stations, said master station including: receiving means connected to said communication link operated in response to the receipt of a plurality of coded pulses transmitted by said remote station over said communication link, said receiving means including, a first timing means operated in response to receipt of pulses of a first electrical condition from said communication link to time the duration of said first condition pulses, and a second timing means operated in response to receipt of pulses of a second electrical condition from said communication link to time the duration of said plurality of second condition pulses; control logic means connected to said receiver means and operated in response to said receiver means; a counting chain connected to said control logic and to said receiving means operated in response to said control logic to count said coded impulses received by said receiver means; and indication means connected to said counting chain operated in response to said counting chain count.

2. A supervisory control system including a master station, a remote station and a communication link between said stations, said remote station including: receiving means connected to said communication link operated in response to the receipt of pulses transmitted from said master station over said communication link, said receiving means including, a first timing means operated in response to receipt of pulses of a first electrical condition from said communication link to time the duration of said first condition pulses, and a second timing means operated in response to receipt of pulses of a second electrical condition from said communication link to time the duration of said second condition pulses; control logic means connected to said receiving means and operated in response to said receiving means; a counting chain connected to said receiving means and to said control logic means, operated in response to said control logic means to count said incoming pulses received by said receiving means; selection means connected to said counting chain selectively operated in response to said pulse count of said counting chain; and a plurality of control means each connected to said selection means, one of said control means operated in response to said selected operation of said selection means.

3. A supervisory control system including a master station, a remote station including a plurality of remote control points, a communication link between said stations, said master station including: line equipment connected to said communication link; receiver means connected to said line equipment operated in response to the receipt of a plurality of coded pulses transmitted by said remote station over said communication link and through said line equipment, said receiver means including, a first timing means operated in renponse to receipt of pulses of a first polarity from said line equipment to time the duration of said first polarity pulses, and a second timing means operated in response to receipt of pulses of a second polarity from said line equipment to time the duration of said second polarity pulses; control logic means connected to said receiver means and operated in response to said receiver means; a counting chain connected to said control logic and to said receiver means operated in response to said control logic to count said coded pulses received by said receiver means; alarm means connected to said counting chain operated in response to the operation of said counting chain; a plurality of point indicating means each connected to said counting chain, said plurality of point indicating means operated in response to said pulse count of said counting chain.

4. A supervisory control system including a master station, a remote station and a communication link between said stations, said remote station including: line equipment connected to said communication link; receiver means connected to said line equipment operated in response to receipt of pulses transmitted from said master station over said communication link through said line equipment, said receiver means including a plurality of timers operated in response to receipt of pulses of different polarities from said line equipment to time the duration of each of said pulses; control logic means connected to said receiver means and operated in response to said receiver means; a counting chain connected to said receiver means and to said control logic means, operated in response to said control logic means; point selection means connected to said counting chain selectively operated in response to said pulse count of said counting chain; a plurality of point control means each connected to said point selection means, one of said point control means operated in response to the selected operation of said point selection means; a plurality of remote control points each associated with one of said point control means, one of said remote control points operated in response to the selected operation of its associated point control means.

5. A supervisory control system as claimed in claim 4 wherein said plurality of timers include: a first timer operated in response to the receipt of pulses of a first polarity from said line equipment to time the duration of said first polarity pulses; and a second timer operated in response to the receipt of pulses of a second polarity from said line equipment to time the duration of said second polarity pulses.

6. A supervisory control system including a master station, a remote station including a plurality of remote control points, and a communication link between said remote and said master stations, said master station including: a counting chain; a plurality of point selection means each connected to said counting chain, a selected one of said point selection means manually operated to select one of said remote control points; control logic means connected to said counting chain; and command control means connected to said control logic means manually operated to actuate said counting chain to scan said plurality of point selection means; transmitting means connected to said control logic means and to said counting chain, operated in response to said control logic to transmit a plurality of coded pulses in accordance with said counting chain scan; line equipment connected between said transmitting means and said communication link, operated in accordance with said pulses from said transmitter to further transmit said pulses over said communication link to said remote station to operate said selected remote control point; said master station further including receiver means connected to said line equipment operated in response to the receipt of a plurality of coded pulses transmitted by said remote station over said communication link and through said line equipment, said receiver means including, first timing means operated in response to receipt of pulses of a first polarity from said line equipment to time the duration of said first polarity pulses, and second timing means operated in response to receipt of pulses of a second polarity from said line equipment to time the duration of said second polarity pulses; said control logic means connected to said receiver means and further operated in response to said receiver means; said counting chain connected to said receiver means, and further operated in response to said control logic means to count said coded pulses received by said receiver means; alarm means connected to said counting chain means operated in response to the operation of said counting chain; and a plurality of point indicating means each connected to said counting chain; said plurality of point indicating means operated in response to said pulse count of said counting chain.

7. A supervisory control system as claimed in claim 6 wherein said counting chain comprises: a plurality of relays sequentially operated in response to the receipt of incoming pulses received from said remote station.

8. A supervisory control system as claimed in claim 6 wherein said control logic means include: a plurality of relays operated in response to said point indicating means, and said receiver means, to control said counting chain means, and control said transmitter means; and further include parity means operated in response to the receipt of certain ones of said coded pulses received from said remote station or transmitted by said master station, to count said pulses.

9. A supervisory control system as claimed in claim 6 wherein said line equipment comprises: tone equipment connected to said communication link, a first polar relay connected to said receiving means and to said tone equipment operated in response to the receipt of incoming code pulse signals received by said tone equipment over said communication link to transmit said coded pulses to said receiving means, a second polar relay connected to said tone equipment and to said transmitting means operated in response to the transmission of coded pulses by said transmitting means to control said tone equipment means to further transmit said coded pulses over said communication link to said remote station.

10. A supervisory control system including a master station, a remote station, and a communication link between said stations, said remote station including: line equipment connected to said communication link; receiver means connected to said line equipment operated in response to receipt of pulses transmitted from said master station over said communication link through said line equipment, said receiver means including, first timing means operated in response to receipt of pulses of a first polarity from said line equipment to time the duration of said first polarity pulses, and second timing means operated in response to receipt of pulses of a second polarity from said line equipment to time the duration of said second polarity pulses; control logic means connected to said receiver means and operated in response to said receiver means; a counting chain connected to said receiver means and to said control logic means operated in response to said control logic means to count said incoming pulses received by said receiver means; point selection means connected to said counting chain, selectively operated in response to said pulse count of said counting chain; a plurality of point control means each connected to said point selection means, one of said point control means operated in response to the selected operation of said point selection means; a plurality of remote control points each associated with a different one of said point control means, one of said remote control points operated in response to the selected operation of its associated point control means; point indication means connected to each of said remote control points, to said counting chain, and to said control logic, operated in response to said operated remote control point; start control logic means further operated in response to said operated point indicating means; said counting chain further operated to scan said point indicating means in response to said control logic means; and transmitter means connected to said control logic means, to said counting chain, and to said line equipment, operated in response to said control logic means to transmit a plurality of coded pulses representative of the status of said remote control points as determied by said counting chain scan; said line equipment further operated in response to receipt of said coded pulses to further transmit said pulses over said communication link to said master station.

11. A supervisory control system as claimed in claim 10 wherein said remote control points each comprise: a work device; and associated control equipment for operating said work device; said control equipment operated in response to said point control means to control said work device.

12. A supervisory control system as claimed in claim 10 wherein said counting chain comprises: a plurality of relays sequentially operated in response to the receipt of incoming pulses received from said master station.

13. A supervisory control system as claimed in claim 10 wherein said control logic means comprise: a plurality of relays operated in response to said point indicating means, and said receiver means to control said counting chain and said transmitter means; and further includes parity means operated in response to the receipt of certain ones of said coded pulses received from said master station or transmitted by said remote station, to count said certain pulses.

14. A supervisory control system as claimed in claim 10 wherein said line equipment comprises: tone equipment connected to said communication link, a first polar relay connected to said receiving means and to said tone equipment operated in response to the receipt of incoming coded pulse signals received by said tone equipment over said communication link to transmit said pulse code to said receiving means, a second polar relay connected to said tone equipment and to said transmitting means operated in response to the transmission of coded pulses by said transmitting means to control said tone equipment means to further transmit said pulse code over said communication link to said master station.

References Cited

UNITED STATES PATENTS

| | | | |
|---|---|---|---|
| 3,305,837 | 2/1967 | Barker | 340—163 |
| 3,360,776 | 12/1967 | Coley | 340—163 |
| 3,046,525 | 7/1962 | Deming et al. | 340—163 |
| 3,110,013 | 11/1963 | Breese | 340—163 |
| 3,119,981 | 1/1964 | Breese | 340—163 |
| 3,122,723 | 2/1964 | Coley et al. | 340—163 |
| 3,349,374 | 10/1967 | Gabielson et al. | 340—163 |

DONALD J. YUSKO, *Primary Examiner.*